United States Patent Office 3,081,185
Patented Mar. 12, 1963

3,081,185
SOLVENT-RESISTANT MOLDED ARTICLES
Harry W. Parker and John W. Marx, Bartlesville, Okla., assignors to Phillips Petroleum Company, a corporation of Delaware
No Drawing. Filed Dec. 28, 1959, Ser. No. 862,036
20 Claims. (Cl. 106—218)

This invention relates to the manufacture of molded articles and to other preformed articles which are resistant to attack by acids and by organic solvents. In one aspect this invention relates to a method for rendering articles molded from finely divided oil shale resistant to attack by selected solvents. In still another aspect the invention relates to the preparation of a molding compound which will produce formed articles which are insoluble in substantially all of the known solvents.

In the prior art molded articles have been prepared from various naturally-occurring materials after suitable preparation. A binder in included to bind the material during molding. The molding is done either by pressure alone or by heat and pressure in combination before, or after, suitable treatment of the naturally-occurring material. Such naturally-occurring materials which have been used heretofore in the molding art include clay, pitch, Gilsonite, rock asphalt, peat, diatomaceous earth, and the like. Many synthetic materials have been developed to provide more desirable properties or more reproducible properties in the molded articles.

It has recently been proposed to produce molded articles by the combined action of heat and pressure on oil shales containing at least about 45 gallons of oil per ton of mineral. Although such articles have utility, the process is not economically attractive because the process is limited to oil shales which are unusually rich in oil content and excludes the vast deposits of oil shales which contain less than 45 gallons of available oil per ton of shale and are, for that reason, more competitive in price for use in the formation of shaped articles than are the richer oil shale deposits. As might be expected, oil shale deposits which assay less than 45 gallons of available oil per ton of oil shale are more abundant than are the richer oil shales.

We have found that oil shales containing at least 15 gallons of non-benzenoid structure kerogen per ton of shale can be utilized in finely divided form as a molding composition for preparing molded articles having excellent properties of hardness, density and appearance which are eminently suitable as materials of construction such as wall boards, floor tiles, conduits, and the like.

It is an object of this invention to improve the acid-resistant properties of articles molded from oil shale. It is also an object of this invention to improve the organic solvent-resistant properties of articles molded from oil shale. It is a further object of this invention to prepare a molding composition from oil shale which is resistant to substantially all of the known solvents. A further object of this invention is to provide a method for treating oil shale so as to improve the solvent-resistant properties of articles molded from such shale. Other objects, advantages and features of this invention will become apparent to one skilled in the art upon a study of this disclosure, including the detailed description of the invention.

We have found that treatment of the powdered oil shale with a carbonate solubilizing acid prior to molding of the shale improves the acid-resistant properties of articles molded therefrom. In a similar manner, extraction of the powdered shale with an organic solvent prior to the molding operation improves the solvent-resistant property of the articles molded therefrom. Oil shales containing at least 15 gallons of non-benzenoid structure kerogen per ton of shale are applicable in the process of this invention.

There is no upper limit on the kerogen content of the shales to be processed, and shales containing 85 or even 100 gallons of non-benzenoid structure kerogen are applicable for use in our invention. Oil shales containing from 25 to 50 gallons of non-benzenoid structure kerogen are particularly applicable for use in preparing either acid-resistant or organic solvent-resistant articles because such shales are fairly abundant and a moderate amount of acid or solvent is required in the treatment. Oil shales containing a higher percentage of kerogen, for example, 60 to 85 or even 100 gallons of kerogen per ton of shale, are preferred for the preparation of molded articles which are resistant to all solvents because less reagents will be required in the treatment of the shale.

In the preparation of molded articles which are resistant to substantially all solvents, the oil shale can be treated with a carbonate-solubilizing acid, such as hydrochloric acid, and with hydrofluoric acid, alternately or simultaneously, so as to remove substantially all of the inorganic matrix, leaving a residue comprised principally of kerogen. This residue can then be treated with an organic solvent such as benzene or pyridine so as to leave a residue which is substantially insoluble in all of the known solvents. This material can then be intimately admixed with about 10 to about 100 parts by weight of carbon black for each 100 parts by weight of residue and molded to provide the solvent-resistant article. This composition is particularly useful for the fabrication of molded conduit liners which are to be used in corrosive services. The kerogen residue resulting from treatment of oil shale with carbonate-solubilizing and silica-solubilizing acids is practically insoluble in all known solvents. Treatment of this material with an organic solvent will remove any remaining constituents which may be soluble in such solvents. Thus, the mixture of the remaining kerogen and carbon black provides a composition which is resistant to the action of substantially all solvents.

The carbonate-solubilizing acids which are useful in this invention include hydrochloric acid, sulfuric acid, nitric acid, phosphoric acid, acetic acid, and the like.

Hydrofluoric acid will normally be used to solubilize the silica content of the oil shale.

While the kerogen present in oil shale is not soluble in any of the common organic solvents, treatment of the oil shales with an organic solvent has been successful in the removal of certain impurities or degradation products which are normally found in oil shales. Useful solvents include benzene, acetone, chloroform, carbon tetrachloride, carbon disulfide, ether, tetrahydronaphthalene, pyridine, and the like. The materials are capable of extracting such oil shale inclusions as bitumens, amber, copal, dammar, pyropissite, and the like, when such materials are present.

The oil shale is crushed or ground to an average particle size such as to pass through a 50 to 200 mesh screen and is then wetted with an alcohol containing from 1 to 6 carbon atoms per molecule, such as methanol, ethanol, propanol, butanol, amyl alcohol or hexanol. The wetted oil shale is then covered with an aqueous acid so as to solubilize the carbonates and/or silica present, and the acid is allowed to contact the shale for a period of about 10 minutes to 20 hours. The shale is then washed with water, dried and molded at a pressure of about 500 to about 20,000 p.s.i. for about one-half to 10 minutes. The mold is then cooled to a temperature below about 250° F. before the pressure is released. The molding temperature will be in the range of 250 to about 400° F. and is, in every case, below the decomposition temperature of the kerogen. The molding time will be that necessary to plasticize the kerogen and will depend upon the molding temperature and size of the article being molded.

The process of making organic solvent-resistant molded articles comprises contacting a finely divided oil shale, containing from about 15 to about 85 gallons of non-benzenoid structure kerogen per ton of shale, with an organic solvent for about 10 minutes to about 20 hours; removing the solvent; and subjecting the shale to molding pressure at a temperature in the range of about 250 to about 400° F.

When substantially all of the inorganic matrix is removed from the oil shale and the remaining kerogen is admixed with carbon black, it is preferable to utilize procedures similar to those employed in the rubber industry, for example, milling or Banbury mixing, to reduce the materials to a plastic and a substantially homogeneous state. Extruders or extrusion rolls can then be utilized to introduce the mixture into the mold or to form articles which can be placed into molds. The composition comprising kerogen and carbon black will be molded under substantially the same molding conditions as the acid- or solvent-treated oil shale, e.g., 500 to 20,000 p.s.i. at a temperature of about 250 to about 400° F. for about one-half to 10 minutes.

The following specific examples present data which illustrate and clarify the invention, but should not be so interpreted as to restrict or limit the invention unnecessarily.

*Example I*

A batch of Colorado oil shale from the Union Retort was comminuted to pass a 100-mesh screen. The oil shale had been assayed to contain 30 gallons per ton of recoverable shale oil. The organic matter in this shale was a kerogen with a predominately non-benzenoid structure. The powdered shale was placed in a 1¼-inch cylindrical mold, heated to 158° C. between the platens of an electrically-heated hydraulic press. When the specified temperature was reached, the mold was closed with an applied pressure of 5,000 p.s.i. The closed mold remained in the press at 158° C. and 5,000 p.s.i. for two minutes. The mold was then removed from the press and cooled below 120° C. before opening. The molded disk had a light brown color and a homogeneous and fine textured surface. The Shore D hardness was 81.

When this disk was covered with 80 percent ethanol and hydrochloric acid added after two hours, the surface was soft and pitted from loss of a large portion of the matrix material.

*Example II*

Another portion of the 100-mesh oil shale powder prepared as in Example I was wetted with 80 percent ethanol, covered with concentrated hydrochloric acid and allowed to stand overnight. The acid was then drained off, the powder washed with distilled water and dried. The treated powder was placed in a 1¼-inch cylindrical mold and molded into a ⅛-inch disk by raising the temperature to 158° C. and applying a pressure of 5,000 p.s.i. to close the mold. After two minutes residence time the mold was removed from the press, cooled below 120° C. and opened.

The disk had a Shore D hardness of 81–83. When the molded disk was treated with concentrated hydrochloric acid after wetting with 80 percent ethanol and standing for two hours, no change was noted in the appearance or other characteristics of the molded disk.

Reinforcing acid- or fire-resistant fibers such as Fiberglas or asbestos could be incorporated into the treated powder on a roll mill before molding, thereby replacing the removed carbonates as reinforcing agents. With Fiberglas good resistance would be retained, while with asbestos fibers a fire retardancy could be imparted to the materials.

Reasonable variations and modifications are possible within the scope of this disclosure without departing from the spirit and scope of the invention.

That which is claimed is:

1. The process of making molded articles from finely divided oil shale containing at least 15 gallons of non-benzenoid kerogen per ton of shale which comprises extracting a portion of the acid soluble inorganic materials from said finely divided oil shale with an acid by contacting said shale with said acid; extracting a portion of the organic materials from the acid-extracted oil shale with an organic solvent capable of extracting oil shale inclusions selected from the group consisting of bitumens, amber, copal, dammar, and pyropissite, by contacting said acid-extracted oil shale with said organic solvent; and subjecting the resulting oil shale to molding pressure at a molding temperature in the range of about 250 to about 400° F. thereby producing articles having substantial resistance to attack by acids and by organic solvents.

2. The process of claim 1 wherein the acid is hydrochloric acid.

3. The process of claim 1 wherein the acid is sulfuric acid.

4. The process of claim 1 wherein the acid is acetic acid.

5. The process of claim 1 wherein the acid is hydrofluoric acid.

6. The process of claim 1 wherein the acid is nitric acid.

7. The process of claim 1 wherein the organic solvent is ether.

8. The process of claim 1 wherein the organic solvent is benzene.

9. The process of claim 1 wherein the organic solvent is acetone.

10. The process of claim 1 wherein the organic solvent is chloroform.

11. The process of claim 1 wherein the organic solvent is carbon tetrachloride.

12. The process of making acid-resistant, molded articles which comprises wetting a finely divided oil shale, containing from about 15 to about 85 gallons of non-benzenoid structure kerogen per ton of shale, with alcohol; contacting the wetted shale with a carbonate-solubilizing acid for about 10 minutes to about 20 hours; removing the acid; washing the shale with water; and subjecting the shale to molding pressure at a temperature in the range of about 250 to about 400° F.

13. The process of making organic solvent-resistant molded articles which comprises contacting a finely divided oil shale, containing from about 15 to about 85 gallons of non-benzenoid structure kerogen per ton of shale, with an organic solvent capable of extracting oil shale inclusions selected from the group consisting of bitumens, amber, copal, dammar and pyropissite for about 10 minutes to about 20 hours; removing the solvent; and subjecting the shale to molding pressure at a temperature in the range of about 250 to about 400° F.

14. The process of making substantially insoluble, molded articles which comprises contacting a finely divided oil shale, containing from about 30 to about 85 gallons of non-benzenoid structure kerogen per ton of shale, with a carbonate-solubilizing acid and with hydrofluoric acid for about 10 minutes to about 20 hours so as to remove substantially all of the inorganic matrix of the oil shale; contacting the residue with an organic solvent capable of extracting oil shale inclusions selected from the group consisting of bitumens, amber, copal, dammar and pyropissite for about 10 minutes to about 20 hours; admixing about 10 to about 100 parts by weight of carbon black with 100 parts by weight of the solvent-contacted residue; and subjecting the resulting mixture to molding pressure at a temperature in the range of about 250 to about 400° F.

15. The process of claim 14 wherein the carbonate-solubilizing acid is hydrochloric acid and the organic solvent is benzene.

16. The process of claim 14 wherein the carbonate-solubilizing acid is sulfuric acid and the organic solvent is chloroform.

17. The process of claim 14 wherein the carbonate-solubilizing acid is nitric acid and the organic solvent is carbon tetrachloride.

18. An acid-resistant article produced by wetting a finely divided oil shale, containing from about 15 to about 85 gallons of non-benzenoid kerogen per ton of shale, with alcohol; contacting the wetted shale with a carbonate solubilizing acid for about 10 minutes to about 20 hours; removing the acid; washing the shale with water; and subjecting the shale to molding pressure at a temperature in the range of about 250 to about 400° F.

19. An organic solvent-resistant article produced by contacting for about 10 minutes to about 20 hours a finely divided oil shale, containing from about 15 to about 85 gallons of non-benzenoid kerogen per ton of shale with an organic solvent capable of extracting oil shale inclusions selected from the group consisting of bitumens, amber, copal, dammar and pyropissite; removing the solvent; and subjecting the shale to molding pressure at a temperature in the range of about 250 to about 400° F.

20. A substantially insoluble article prepared by wetting a finely divided oil shale, containing from about 15 to about 85 gallons of non-benzenoid kerogen per ton of shale, with alcohol; contacting the wetted shale with a carbonate solubilizing acid and with hydrofluoric acid for about 10 minutes to about 20 hours to remove substantially all the inorganic matrix of the oil shale; contacting the residue with an organic solvent capable of extracting oil shale inclusions selected from the group consisting of bitumens, amber, copal, dammar and pyropissite for a period of about 10 minutes to 20 hours; admixing about 10 to about 100 parts by weight of carbon black with 100 parts by weight of the solvent-contacted residue; and subjecting the resulting mixture to molding pressure at a temperature in the range of about 250 to about 400° F.

References Cited in the file of this patent

UNITED STATES PATENTS

| | | |
|---|---|---|
| 2,079,343 | Fischer et al. | May 4, 1937 |
| 2,466,435 | Jones et al. | Apr. 5, 1949 |
| 2,900,269 | Bauman et al. | Aug. 18, 1959 |